(12) United States Patent
Muraleev et al.

(10) Patent No.: US 11,733,058 B2
(45) Date of Patent: Aug. 22, 2023

(54) METHODS AND SYSTEMS FOR GENERATING PARKING ROUTES

(71) Applicants: TomTom Traffic B.V., Amsterdam (NL); TomTom Navigation B.V., Amsterdam (NL)

(72) Inventors: Timur Muraleev, Berlin (DE); Falk Hueffner, Berlin (DE); Alexander Kroeller, Leipzig (DE); Neil Clavin, Berlin (DE); Steffen Gunther Wiesner, Berlin (DE); Massimo Guggino, Berlin (DE); Michael Marte, Berlin (DE); Henning Hasemann, Berlin (DE)

(73) Assignees: TomTom Navigation B.V., Amsterdam (NL); TomTom Traffic B.V., Amsterdam (NL)

( * ) Notice: Subject to any disclaimer, the term of this patent is extended or adjusted under 35 U.S.C. 154(b) by 53 days.

(21) Appl. No.: 16/982,570

(22) PCT Filed: Mar. 19, 2019

(86) PCT No.: PCT/EP2019/056814
§ 371 (c)(1),
(2) Date: Sep. 20, 2020

(87) PCT Pub. No.: WO2019/180004
PCT Pub. Date: Sep. 26, 2019

(65) Prior Publication Data
US 2021/0010824 A1    Jan. 14, 2021

(30) Foreign Application Priority Data
Mar. 19, 2018 (GB) ..................................... 1804395

(51) Int. Cl.
*G01C 21/36* (2006.01)
*G01C 21/00* (2006.01)
(Continued)

(52) U.S. Cl.
CPC ..... *G01C 21/3685* (2013.01); *G01C 21/3407* (2013.01); *G01C 21/3492* (2013.01);
(Continued)

(58) Field of Classification Search
CPC ............ G01C 21/3685; G01C 21/3407; G01C 21/3492; G01C 21/3676; G01C 21/3867; G08G 1/143
See application file for complete search history.

(56) References Cited

U.S. PATENT DOCUMENTS

2009/0171563 A1* 7/2009 Morimoto .......... G01C 21/3685
701/533
2010/0198498 A1* 8/2010 Jansen ................... G01C 21/26
701/533
(Continued)

FOREIGN PATENT DOCUMENTS

EP 2075539 A2 7/2009
EP 2587220 A1 1/2013
(Continued)

OTHER PUBLICATIONS

Search Report dated Aug. 30, 2018 for United Kingdom patent application No. 1804395.0.
(Continued)

*Primary Examiner* — Faris S Almatrahi
*Assistant Examiner* — Abdalla A Khaled
(74) *Attorney, Agent, or Firm* — Park, Vaughan, Fleming & Dowler LLP

(57) ABSTRACT

A method of determining a parking route for a vehicle travelling on a road network within a geographic area is disclosed. A sub-network is determined comprising a subset of segments of an electronic map that are representative of roads within a predetermined walking time or distance of a destination location. Data indicative of a walking time or distance from the segment to the destination location is associated, at least with the segments of the sub-network representing roads having at least one associated parking space. A search algorithm having an associated cost function is used to explore the segments of the sub-network from an
(Continued)

origin location to identify a plurality of candidate parking routes, wherein the cost for a given parking route is based on the probability of the vehicle successfully finding a parking space on the parking route and the expected cumulative travel and walking time or distance to the destination location should a parking space be found along the parking route.

20 Claims, 5 Drawing Sheets

(51) Int. Cl.
    *G01C 21/34*     (2006.01)
    *G08G 1/14*     (2006.01)

(52) U.S. Cl.
    CPC ..... *G01C 21/3676* (2013.01); *G01C 21/3867* (2020.08); *G08G 1/143* (2013.01)

(56) References Cited

U.S. PATENT DOCUMENTS

| | | | | |
|---|---|---|---|---|
| 2012/0161984 A1* | 6/2012 | Amir | ...................... | G08G 1/147 340/932.2 |
| 2013/0265174 A1* | 10/2013 | Scofield | ................ | G08G 1/146 340/932.2 |
| 2013/0268187 A1* | 10/2013 | Scofield | ............. | G01C 21/3685 701/400 |
| 2014/0214319 A1* | 7/2014 | Vucetic | .............. | G01C 21/3407 701/540 |
| 2016/0025503 A1* | 1/2016 | Kees | ...................... | G08G 1/143 701/400 |
| 2016/0210860 A1* | 7/2016 | Belzner | .................. | G08G 1/147 |
| 2017/0138746 A1 | 5/2017 | Eliassi | | |
| 2017/0150307 A1* | 5/2017 | Himmelreich | ......... | G08G 1/147 |
| 2018/0075744 A1* | 3/2018 | Seo | ...................... | G05D 1/0088 |
| 2019/0063947 A1* | 2/2019 | Beaurepaire | ....... | G01C 21/3423 |
| 2019/0128682 A1* | 5/2019 | Hori | .................... | G01C 21/3423 |
| 2020/0011671 A1* | 1/2020 | Puri | ................... | G01C 21/3492 |
| 2021/0080283 A1* | 3/2021 | Belzner | .................... | G06N 7/01 |

FOREIGN PATENT DOCUMENTS

| | | |
|---|---|---|
| EP | 3056860 A2 | 8/2016 |
| GB | 2528081 A | 1/2016 |
| GB | 2529058 A | 2/2016 |
| JP | 2009162569 A | 7/2009 |
| JP | 2016118569 A | 6/2016 |
| WO | 2010081545 A1 | 7/2010 |

OTHER PUBLICATIONS

International Search Report dated Jun. 25, 2019 for International patent application No. PCT/EP2019/056814.

* cited by examiner

METHODS AND SYSTEMS FOR GENERATING PARKING ROUTES

CROSS-REFERENCE TO RELATED APPLICATIONS

The present application is a National Stage of International Application No. PCT/EP2019/056814, filed on September 19 March, 2019, and designating the United States, which claims benefit to United Kingdom Application 1804395.0 filed on Mar. 19, 2018. The entire content of these applications is incorporated herein by reference.

FIELD OF THE INVENTION

This invention relates to a method of generating one or more parking routes for a vehicle travelling on a navigable, e.g. road, network within a geographic area represented by an electronic map, as well as a system, a server and a navigation device on which part or all of the method may be implemented. The parking routes may thus be used, but not exclusively, for guiding a user of an electronic navigation device, such as a portable navigation device (PND), during a parking search, i.e. a search for a vacant, typically on-street, parking space.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

It will be appreciated that finding an empty parking space when arriving at a destination location is often a daunting and time-consuming experience. For instance, especially in congested urban environments, drivers face the uncertainty of finding parking at the destination, and are often forced to drive in loops around the destination to find an empty spot. This results in the loss of precious time, greater fuel consumption and more vehicle emissions. Indeed, it is estimated that approximately 30% of urban traffic is due to people searching for parking spaces. Accordingly, some navigation devices have a function that provides guidance to parking spaces near the vehicle's current position or in the vicinity of the destination. For example, in order to assist users finding a parking spot it is known to suggest a route along roads with a high probability of yielding a vacant parking space. In this parking search mode of operation the user may thus be guided along a "parking route" (or "parking space search route") that attempts to increase the probability of finding a parking space and thus reduce the time spent during the parking space search. Various known approaches for generating parking routes are described, for example, in EP 2075539 A2, WO 2011/157296 A1 and the paper "ParkAssistant: An Algorithm for Guiding a Car to a Parking Spot" by Djuric et al. as submitted for presentation and publication to the 95th Annual Meeting of the Transportation Research Board, January 2016. A further approach for generating parking routes is described in the paper "Probabilistic Routing for On-Street Parking Search" by Arndt et al. (DOI: 10.4230/LIPIcs.ESA.2016.264).

The Applicant believes, however, that there still remains scope for improvement in the generation of such parking routes.

SUMMARY OF THE INVENTION

In accordance with a first aspect of the invention there is provided a method of determining a parking route for a vehicle travelling on a road network within a geographic area, wherein at least some roads of the road network have at least one parking space associated therewith, the road network being represented by an electronic map comprising a plurality of segments representing the roads of the road network, each segment having one or more attributes associated therewith including a length attribute indicative of the length of the segment, and wherein at least the segments representing roads having at least one parking space have a probability attribute indicative of the probability of there being a vacant parking space on that segment, the method comprising:

obtaining a destination location within the geographic area;

determining a sub-network comprising a subset of segments of the electronic map that are representative of roads within a predetermined walking time or distance of the destination location;

associating, at least for the segments of the sub-network representing roads having at least one associated parking space, data indicative of a walking time or distance from the segment to the destination location;

exploring, using a search algorithm having an associated cost function, the segments of the sub-network from an origin location to identify a plurality of candidate parking routes, wherein each candidate parking route comprises a path of connected segments of the sub-network, said exploring comprising determining a cost for each of the plurality of candidate parking routes according to the cost function using the length attribute and probability attribute of each of segments of the parking route, wherein the cost for a given parking route is based on the probability of the vehicle successfully finding a parking space on the parking route and the expected cumulative travel and walking time or distance to the destination location should a parking space be found along the parking route; and selecting one or more of the candidate parking routes for output based on the determined costs.

Thus, at least in embodiments, the method proceeds by determining a sub-network of segments of an electronic map representing a navigable network, in this case a road network, that are within a predetermined walking time or distance of a destination location. At least some of the navigable elements, i.e. roads, represented by the segments of the sub-network have parking spaces. A probability attribute can thus be associated with those segments indicative of the probability of there being a vacant space on the road (or portion thereof) represented by the segment. Data indicative of the walking time or distance to the destination location is also provided at least for the segments having at least one parking space associated therewith. Preferably the data indicative of the walking time or distance from the segment to the destination location is calculated as part of the step of determining the sub-network of segments. Each segment also has a length attribute indicative of the length of the road (or portion thereof) represented by the segment, and which in embodiments thus enables an associated travel time to be determined (when taken in conjunction with a speed of travel). A plurality of candidate parking routes within the sub-network can then be identified by exploring the segments of the sub-network from an origin location (in the portion of the road network represented by the sub-network) using a suitable search algorithm and for each candidate parking route a cost may be determined that takes into account (among other things) the probability of the vehicle successfully finding a parking space on the parking route and the expected cumulative travel and walking time or distance to the destination location should a parking space be found along the parking route. Thus, the cost for a parking route may generally be determined using the length and probability attributes for each of the plurality of segments of the parking route as well as the data indicative of the walking time or distance to the destination location. The candidate parking routes can then be ranked or otherwise compared on the basis of the determined costs and one or more parking routes, e.g. typically the parking route having the optimum, e.g. minimum, cost, may then be selected for output, e.g. for display to the user, accordingly.

In contrast to the approach described in the paper "Probabilistic Routing for On-Street Parking Search" by Arndt et al., the identification and cost determination for candidate parking routes is restricted to a sub-network of segments that are within a predetermined walking time or distance of a destination location within the geographic area. The generation and use of this sub-network is believed, at least in some preferred embodiments, to provide various advantages both from an algorithmic and domain modelling perspective.

The present invention extends to a system for carrying out a method in accordance with any of the aspects or embodiments of the invention herein described.

In accordance with a second aspect of the invention there is provided a system for determining a parking route for a vehicle travelling on a road network within a geographic area, wherein at least some roads of the road network have at least one parking space associated therewith, the road network being represented by an electronic map comprising a plurality of segments representing the roads of the road network, each segment having one or more attributes associated therewith including a length attribute indicative of the length of the segment, and wherein at least the segments representing roads having at least one parking space have a probability attribute indicative of the probability of there being a vacant parking space on that segment, the system comprising:

means for obtaining a destination location within the geographic area;

means for determining a sub-network comprising a subset of segments of the electronic map that are representative of roads within a predetermined walking time or distance of the destination location;

means for associating, at least for the segments of the sub-network representing roads having at least one associated parking space, data indicative of a walking time or distance from the segment to the destination location;

means for exploring, using a search algorithm having an associated cost function, the segments of the sub-network from an origin location to identify a plurality of candidate parking routes, wherein each candidate parking route comprises a path of connected segments of the sub-network, said exploring comprising determining a cost for each of the plurality of candidate parking routes according to the cost function using the length attribute and probability attribute of each of segments of the parking route, wherein the cost for a given parking route is based on the probability of the vehicle successfully finding a parking space on the parking route and the expected cumulative travel and walking time or distance to the destination location should a parking space be found along the parking route; and means for selecting one or more of the candidate parking routes for output based on the determined costs.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

As will be appreciated by those skilled in the art, these further aspects of the present invention can and preferably do include any one or more or all of the preferred and optional features of the invention described herein in respect of any of the other aspects of the invention, as appropriate.

The present invention is a computer implemented invention, and any of the steps described in relation to any of the aspects or embodiments of the invention may be carried out under the control of a set of one or more processors. The means for carrying out any of the steps described in relation to the system may be a set of one or more processors and/or processing circuitry. In general, any of the steps described in relation to the method or system may be performed using individual processing circuitry (stages), or using shared processing resource.

In general, it will be appreciated that the various functions of the invention described herein can be carried out in any desired and suitable manner. For example, the steps and functions of the invention described herein can be implemented in hardware or software, as desired. Thus, for example, unless otherwise indicated, the various processing circuitry, functional elements, stages, and "means" of the invention described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The system of the present invention in any of its embodiments may be in the form of any suitable device, such as a navigation device. In general, the system of the present invention may be at least one processing device. The or a processing device may be a device of a mobile device, such as a navigation device, whether a portable navigation device (PND) or an integrated device, or may be a device of a server.

The method of the present invention is preferably implemented in the context of a navigation operation. Thus, the method is preferably carried out by a set of one or more processors of a device or system having route generating capability and/or navigation functionality, as required. For example, the methods may be implemented by a computer system, e.g. a desktop or laptop system, which does not have navigation functionality.

In preferred embodiments the method of the present invention in any of its aspects or embodiments is carried out using a mobile device, such as a navigation device, and the present invention extends to a mobile, e.g. navigation, device arranged to carry out the steps of the method of any of the aspects or embodiments of the invention. The navigation device may be a PND or an integrated, e.g. in-vehicle, device.

In accordance with any of the aspects or embodiments of the invention the navigation device may comprise a display for displaying an electronic map to a user, a set of one or more processors configured to access digital map data and cause an electronic map to be displayed to a user via the display, and a user interface operable by a user to enable the user to interact with the device. Thus, the system of the present invention may be a system, e.g. processing device of a navigation device.

Regardless of its implementation, a device, e.g. navigation apparatus, used in accordance with the present invention in any of its aspects or embodiments may comprise a processor, memory, and digital map data (or electronic map) stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include global navigation satellite system (GNSS), e.g. GPS or GLONASS, signal reception and processing functionality. As will be appreciated the navigation apparatus may use other means for determining its current location as desired, e.g. terrestrial beacons, the mobile telecommunications network, etc. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments the method of the present invention in any of its aspects or embodiments may be carried out by a server, and the present invention extends to a server arranged to carry out the steps of the method of any of the aspects or embodiments of the invention. The system of the present invention of any of its aspects or embodiments may be a system e.g. processing device of a server.

Of course, the steps of the method of the present invention in any of its aspects or embodiments may be carried out in part by a server and in part by a navigation apparatus. For example route generation may be carried out by a server, e.g. at the request of a navigation device, and provided to the device for output to a user. The steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication. Thus, the system of the present invention may be provided in part by a navigation device or other mobile device, and in part by a server.

The electronic map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of three lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc.

It should be noted that the term "segment" as used herein takes its usual meaning in the art. A segment of an electronic map is a navigable link that connects two points or nodes. While embodiments of the present invention are described with particular reference to road segments, it should be realised that the invention may also be applicable to other navigable segments, such as segments of a path, river, canal, cycle path, tow path, railway line, or the like. Thus, any reference to a "road segment" may be replaced by a reference to a "navigable segment" or any specific type or types of such segments.

Embodiments of the present invention are concerned with determining a parking route for a vehicle travelling on a navigable (road) network within a geographic area. It will be understood that a "parking route" is generally a route throughout the navigable network that has been determined as having a high probability for finding a vacant parking space along the parking route, i.e. so that the driver can successfully park. A parking route may therefore also be considered, and alternatively referred to, as a "parking space search route". The parking route thus represents a route along with the user may be guided during a parking search when attempting to find a parking space within the vicinity of a destination location. Such parking routes may be generated as part of an initial planning of a route to a predetermined destination location, i.e. so that the end portion of the route incorporates a parking search. However, more typically the parking route is generated from or based on a current position of the vehicle. This may be toward the end of a pre-determined route, whether or not in response to a user request, or the initiation of parking route generation may be in response to a user request while free driving.

For example, in embodiments, the destination location may be the ultimate destination or end-point of a predetermined route along which the user is being guided. That is, the destination location may be a predetermined known location within the navigable network. Thus, when the vehicle (i.e. device) is approaching the end-point of the predetermined route, the navigation guidance may switch from the normal route navigation mode into a parking search mode wherein a parking route is determined that increases (or maximises) the likelihood of finding a parking space within the vicinity of the end-point of the route and the user is directed along the determined parking route. This switch may happen automatically when approaching a destination (e.g. when the vehicle (device) is determined as being within a predetermined threshold distance of the destination, which may e.g. be set depending on the destination and the expected availability of parking spaces in the vicinity thereof). However, more typically, the user will be prompted to activate parking search guidance when approaching the destination location. Upon the user activating parking search guidance, a suitable parking route may thus be determined and provided as output.

In other embodiments, the destination location may be the current location of the vehicle. For instance, when there is no predetermined route and destination (e.g. when operating in free-driving mode), the user may select to activate parking search guidance at any time in order to determine an appropriate parking route for finding a vacant parking space around the vicinity of their current location within the navigable network.

In general, the destination location for which parking routes are generated may be any location within the navigable network. For example, the user may select a desired destination location and appropriate parking routes for that destination location may be generated accordingly.

It will be appreciated that the determined parking route is intended to increase the likelihood of finding a vacant parking space (and/or to reduce the expected time for finding a vacant parking space). For instance, and in general, at least some of the navigable elements within a given navigable network will have at least one parking space associated therewith, e.g. especially where the navigable network represents an urban or suburban geographic area. In order to increase the likelihood of finding a vacant parking space the parking route should thus generally guide the user along segments where there is a high likelihood of there being a vacant parking space. As used herein, it will be understood that a "parking space" refers to "on-street" parking (rather than "off-street" parking, e.g. in a car park). That is, the present invention is generally concerned with generating parking routes that yield a high probability of finding on-street parking along the route.

At least the segments having a parking space associated therewith also have an associated probability attribute representing the probability of there being a vacant parking space on that element—i.e. so that a driver may successfully park on that segment (so, for instance, where there are no parking spaces associated with a segment that segment may have a zero probability). The method may thus comprise a step of obtaining the parking probabilities at least for the segments having a parking space associated therewith. The parking probabilities for the segments may be obtained in any suitable and desired way. For instance, the parking probabilities for the segments of the (sub-) network may be obtained from a server. It is also contemplated that the parking probabilities associated with the segments may be stored within the electronic map. Various suitable methods are known for determining the parking probability of a segment, such as those described in WO 2010/081546 A1, WO 2011/157296 A1 and PCT/EP2017/074855; the content of all of which is incorporated herein by reference.

It will be appreciated that a segment may, and in embodiments does, have a plurality of associated parking probability attributes, e.g. parking probability values, associated therewith, each value being in respect of a different period of time. That is, the probability values for the segments (and that are e.g. used to determine the cost of a parking route as discussed below) may be selected based on the time at which each road is traversed by a vehicle. The parking probability value can be taken from a historical time-dependent parking profile associated with the road in question, or potentially a live probability value could be used temporarily in replace of the historical value, e.g. as described in WO 2011/157296 A1.

At least some, although not necessarily all, the segments of the electronic map may also have various other parking related parameters associated therewith, e.g. an expected or average parking search time for that segment based on historical data, etc. The term "expected parking search time" as used herein refers to the expected time to find a parking space in the vicinity after arriving at the segment with the aim of parking on the segment. The term "parking probability" for a segment used herein refers to the likelihood of finding a parking space on the segment. The value of the parking related parameter, e.g. parking probability value or expected parking search time value, is a measure reflecting the typical parking situation on the element represented by the respective segment, or, in the vicinity thereof as appropriate. The parking related parameter value is thus a historical measure representative of the expected value of the parameter e.g. the likelihood of finding a parking space on a navigable element or the expected time to find a parking space based on the analysis of historical data. In preferred embodiments in which the parking related parameter is a parking probability, the higher the parking probability parameter value the greater the likelihood of successfully parking on the navigable element represented by the segment. Although, it will be appreciated, that the parking probability parameter value could be defined such that the lower the parking probability parameter value the greater the likelihood of successfully parking on the navigable element represented by the segment.

In some embodiments, and as will be discussed in more detail below, these parking related parameters may be visualised and displayed to the user along with the parking route, e.g. during parking search guidance mode.

Each of the segments additionally has an associated length attribute indicative of the length of the road (or portion thereof) represented by the segment, and which thus enables a travel time or distance for the segment to be determined. For example, the travel distance for travelling along a segment will generally correspond to the length of the road (or portion thereof) represented by the segment. A travel time for a segment can thus be determined from the length of the segment by assuming a constant driving speed (e.g. of 12 km/h, which may be a typical cruising speed during a parking search). However, it is also contemplated that the determination of the travel time for a segment may take into account other attributes and/or traffic conditions of the segment. For instance, and especially on segments on which parking is not possible (such that the assumed constant driving speed may not accurately reflect the behaviour of the driver), the travel time may be determined using a predetermined time-dependent speed profile for that segment, e.g. as described in WO 2009/053411 A1 and WO 2017/129586 A1; the entire content of which is incorporated herein by reference. In other words, each segment of the sub-network also has associated with it data indicative of a travel (e.g. driving) time or distance for travelling along that segment.

The method involves a step of determining a sub-network of the navigable (road) network in a portion of the geographic area comprising a subset of segments of the electronic map that are within a predetermined walking time or distance of a destination location within the geographic area. Data indicative of a walking time or distance to the destination location from the segment, preferably calculated during the determination of the sub-network, may thus be associated with at least some of the segments of the sub-network. A walking time or distance may be associated with each of the segments of the sub-network. However, in general, it will be appreciated that a walking time or distance need only be determined (and in embodiments is only determined) for the segments on which parking is possible, i.e. those segments having at least one parking space, as there is no possibility of the vehicle (legally) parking on other segments and walking to the destination location. The method therefore comprises a step of associating or obtaining, at least for the segments of the sub-network representing navigable elements having at least one associated parking space, data indicative of a walking time or distance to the destination from the segment. For example, a walking time may be determined from the distance by assuming a suitable constant walking speed (e.g. of 5 km/h, although this may be changed as desired depending on the user's preference).

In embodiments, the sub-network determination may involve a search, preferably a backwards search, from the destination location to define a reachability area (e.g. as described in WO 2014/001565 A1; the entire content of which is incorporated herein by reference). That is, the step of determining the sub-network may comprise performing a, e.g. backwards, reachability search from the destination location. However, it is also contemplated that a more simplistic method could be used, e.g. based on a straight line distance between each road segment and the destination location. The predetermined walking time or distance, and hence the size of the sub-network, may be selected or changed as desired, e.g. depending on the user's preferences. For instance, although other values may suitably be used, it has been found that a suitable walking distance may be about 400 m (corresponding to a walking time of 4.8 minutes assuming a constant walking speed of 5 km/h).

In embodiments in which a reachability area is defined, the area is preferably determined by (backwards) searching the segments of the electronic map using route planning algorithm to explore segments from a departure node representative of the destination location so as to determine a reachable area for the departure node, said searching comprising: determining a first cost for each explored segment using a cost function associated with the route planning algorithm; and determining a second cost for each explored segment using an objective function, such that each node reached by the route planning algorithm has a first accumulated cost and a second accumulated cost, wherein the first accumulated cost is the minimum accumulation of first costs for segments forming a route from the departure node to the node, wherein the second accumulated cost is the accumulation of second costs for the segments forming the route from the departure node to the node, and wherein the reachable area is based on a predetermined second accumulated cost value, such that a node is identified as unreachable when the second accumulated cost for the node exceeds the predetermined second accumulated cost value. The cost function of the route planning algorithm is preferably selected to determine shortest routes or fastest routes to the departure node. The second cost for each explored segment determined using the objective function is one of travelling time and travelling distance, such that the predetermined second accumulated cost value corresponds, respectively, to a maximum travel time or a maximum travel distance.

In some cases the segments that are navigable during the parking search when the user is in the vehicle may be different to the segments that are navigable when the user has parked and is walking to the destination location. For example, while the sub-network will only include road segments, i.e. segments that can be traversed by a vehicle (and potentially also by a person), the determination of the sub-network can also take into account pedestrian segments of the electronic map, i.e. segments that can only be traversed by a person, to give a more accurate walking time or distance for a segment. In embodiment, for example, the (backwards) search preferably used to determine the sub-network may take into account pedestrian segments.

The end result of the above is thus the determination of a sub-network of the electronic map that represents navigable elements (roads) within a certain walking time or distance of the destination, at least some of which have at least one parking space.

The segments of the sub-network may then be explored, using a suitable search algorithm, from an origin location in the portion of the geographic area represented by the sub-network to identify a plurality of possible (candidate) parking routes. The method may thus comprise a step of identifying a plurality of candidate parking routes within the sub-network. Each parking route comprises a path of connected segments of the sub-network extending from an origin location within the network. The origin location may be any suitable segment within the sub-network, e.g. depending on the situation. For example, the origin location may be the current location of the vehicle, which may typically be the case where the user is not following a predetermined route and decides to manually trigger the calculation of a parking route (it will be appreciated that in this case the origin location from which the parking route is generated and the destination location used to define the sub-network may both be the current location of the vehicle). Alternatively, in some cases, especially where the user is following a predetermined route to a known destination location, the origin location may be the first segment of the sub-network along the predetermined route, or e.g. the first segment of the sub-network that the vehicle reaches after the user has manually triggered, or confirmed an automatic suggestion to trigger, the calculation of a parking route. It should be noted that the parking route does not need to include the destination location, and often will not. That is, the parking route is not aiming to generate a route that ends at the destination location but rather a route that has a relatively high likelihood of finding a parking space within the vicinity (i.e. within the desired walking distance or time) of the destination location.

Various suitable search algorithms may be used, as desired, to explore the segments of the sub-network and identify candidate parking routes. In embodiments, a breadth-first search algorithm such as a branch-and-bound algorithm may be used, wherein a set of paths through the sub-network from the origin location (i.e. candidate parking routes) are held and all possibilities of extending the paths by one segment are generated. The paths may be extended in this way until a maximum length is reached, and the 'best' recorded path or paths may then be returned. Thus, in embodiments, in order to bound the overall running time of the search algorithm, the method may comprise setting a maximum number of segments for inclusion within the candidate parking routes that are being identified by the search algorithm. Similarly, the method may also, or alternatively, comprise setting a maximum number of candidate parking routes that are held by the search algorithm during the step of exploring the segments of the sub-network. The maximum number of segments/candidate parking routes may be set as desired to provide a reasonable running time, e.g. depending on the relevant processing circuitry.

For some paths (i.e. candidate parking routes) it can be proven that the path cannot be extended to an optimal path, or that extending the path would yield only negligible improvements. In this case, when it is determined that a path cannot be extended to an optimal path, or that extending the path would yield only negligible improvements, such paths may be pruned and not processed further.

Often a good solution may be found relatively quickly. Conventionally, a lot of time would then be wasted looking for further solutions without any substantial improvements. Thus, in embodiments, this case can be detected so that the search algorithm can be terminated early when a candidate parking route with a sufficiently high probability is identified, e.g. when a candidate parking route is identified for which the probability of the vehicle successfully finding a parking space on the parking route exceeds a predetermined parking success probability threshold. For example, when a parking route having a parking success probability above the desired threshold is found and afterwards there is no improvement for a certain number of cycles the search algorithm may be terminated early. Alternatively, when a parking route having a success probability above the desired threshold is found, one or more candidate parking routes for output based on the determined cost may be selected, while the segments of the sub-network are still being explored.

For each of the identified candidate parking routes a cost may be determined, e.g. in order to allow the candidate parking routes to be ranked or otherwise compared so that the best or optimal candidate parking route(s) may be output. The cost for a given candidate parking route is determined using a cost function. The step of determining the costs for the candidate parking routes may in principle be performed after a set of candidate parking routes have been identified. However, more typically, the search algorithm used to identify the candidate parking routes includes an associated cost function so that the costs for the candidate parking routes can be determined as part of the step of exploring the segments of the sub-network. For instance, in this way, only the best candidate parking routes having the lowest cost need to be held and the other candidate parking routes can suitably be pruned, e.g. as described above.

The cost for a given parking route may generally be based on, although not exclusively, as will be explained further below, the probability of the vehicle successfully finding a parking space on the parking route and the expected cumulative travel and walking time or distance to the destination location should a parking space be found along the parking route. That is, the cost function is generally a multivariate function including a first variable ($p^s$) representative of a probability of the vehicle successfully finding a parking space when traversing a parking route and a second variable ($t^s$) representative of an expected cumulative travel time or distance along the parking route and walking time to the destination location should a vacant parking space be found when traversing the parking route.

The parking success probability ($p^s$) for a route may be determined by appropriately considering the parking probabilities for each of the segments along the parking route.

Similarly, the expected cumulative travel and walking time or distance ($t^s$) may be determined by appropriately considering the travel times or distances and walking times or distances associated with each of the segments along the parking route. The "expected" cumulative travel and walking time or distance is thus a measure representative of the total time (or distance) associated with successfully parking on that route, including the time taken (or distance involved) to travel along the route to find a parking space and then walking from the parking space to the destination location. The expected cumulative travel and walking time (distance) may thus be a suitably weighted average of the travel and walking times (distances) for each of the segments along the route. For example, the cumulative travel and walking time or distance for a segment may generally be determined by summing the travel time or distance to reach that segment and the walking time or distance to then reach the destination location from that segment.

In embodiments, the cumulative travel and walking time or distance is calculated by assuming that when parking is found on a segment the parking is found in the middle of the segment. It has been found that this may be expected to give a more realistic cost value, at least on average, e.g. based on an assumption that parking spaces are more or less evenly distributed along segments. Thus, an additional term representing half the length of the segment may be included in the sum to determine the cumulative travel and walking time or distance for a segment. (By contrast in the methods described in Arndt et al. such a term is not included.)

The expected cumulative travel and walking time or distance for a parking route can then be determined as an average of the cumulative travel and walking times or distances for each of the segments along the parking route, preferably weighted by the probability of successfully parking on each segment (which is the combination of not finding parking on an earlier segment along the route and then finding parking on that segment).

Thus, the method may comprise determining a cost for each of the plurality of candidate parking search routes based on the cost function and using the length and probability attributes for each of the plurality of segments of the parking route as well as the data indicative of the walking times or distances.

It will be appreciated that the algorithms used to calculate a parking route according to embodiments of the present invention may be generally similar to those described in the paper of Arndt et al. For instance, in contrast to many previous applications where a cost can be determined for each segment individually (i.e. only based on attributes of the segment), such that the cost for a route is simply the summation of the individual segment costs, in embodiments a cost is determined for each potential route (as a whole) using the attributes for each of the segments forming the route.

In the methods described in Arndt et al. a cost function is defined for a candidate parking route that, so long as the probability of the vehicle successfully finding a parking space when traversing the parking route is sufficiently high (i.e. above a selected threshold, such that $p^s > 1-\epsilon$, wherein the value of $\epsilon$ is generally chosen to be relatively small), is given by the sum of a first term representing the probability of the vehicle successfully finding a parking space when traversing a parking route multiplied by an expected cumulative travel time along the parking route and walking time to the destination location should a vacant parking space be found when traversing the parking route (i.e. $p^s t^s$) and a second term representing the probability of the vehicle not successfully finding a parking space when traversing a parking route multiplied by the total time taken to traverse the parking route ($t_n$) (i.e. $(1-p^s)t_n$). For any parking routes wherein the probability of the vehicle successfully finding a parking space when traversing the parking route is not sufficiently high (i.e. the condition $p^s > 1-\epsilon$ is not satisfied) the cost is simply set to infinity so that the candidate parking route is essentially disregarded.

It can be seen that the cost function used in Arndt et al. corresponds to the assumption that when reaching the end of the parking route (after time $t_n$), parking will be found immediately and there will be zero walking time to the destination. The assumption in Arndt et al. is that provided that the value of $\epsilon$ is sufficiently small, so that it is highly likely that the vehicle will successfully park on the parking route, it is unlikely that the vehicle will reach the end of the parking route and that this assumption does not therefore matter too much. However, the Applicant has recognised that there may be various problems associated with this approach, both from algorithmic and domain modelling perspectives. For instance, using the approach described in Arndt et al. a path with the same time expectation but with a different parking probability (but below the threshold $1-\epsilon$) would be given the same (i.e. infinite) cost. This can make it harder to guide the optimisation process towards more promising paths. Furthermore, there is no universally 'good' value for the threshold (i.e. for $\epsilon$). For instance, given the constraints on walking and total time, if the threshold is set too high no suitable parking routes may be generated. On the other hand, if the threshold is set too low a parking route with the same time expectation but with a different parking probability would have the same cost, even though for the user the parking route with the higher parking probability is clearly better.

Thus, in embodiments, an improved model is used wherein the cost function is changed to offer a more practical, real-world solution. In particular, the cost function (for all parking routes) may include a sum of a first term representing the probability of the vehicle successfully finding a parking space when traversing a parking route weighted (e.g. multiplied, although other suitable weightings may potentially be used) by an expected cumulative travel time or distance along the parking route and walking time or distance to the destination location should a vacant parking space be found when traversing the parking route (e.g. $p^s t^s$) and a second term representing the probability of the vehicle not successfully finding a parking space when traversing a parking route weighted (e.g. multiplied) by a penalty. The penalty may include the total time or distance for traversing the parking route (e.g. $t_n$, similarly as in Arndt et al.). However, preferably, the penalty additionally includes the time or distance for driving from the end of the parking route to the destination location ($t^e$). Optionally, the penalty also includes a constant penalty ($t^b$) which may be set as desired depending on the user's preference. That is, in embodiments, the second term may generally be proportional to $(1-p_s)(t_n + t^e + t^b)$. By including the additional time or distance taken to drive from the end of the route to the destination in the cost determination (i.e. in the cost function), the cost value may more accurately reflect the reality of the situation when parking is not found. Furthermore, because the same cost function may be used for all parking routes (i.e. there is preferably no threshold criteria like that used in Arndt et al.) cost values can be determined for all candidate parking routes within the sub-network that are being considered. The optional constant penalty is a "constant" value that may be added for all candidate parking routes that is intended to reflect the user's tolerance for following a parking route as opposed to implementing an alternative plan (e.g. going home, or paying for off-street parking).

Thus, in embodiments, the determined cost for a given parking route includes a sum of: a first term representing the probability of the vehicle successfully finding a parking space when traversing the parking route weighted (e.g. multiplied) by an expected cumulative travel time or distance along the parking route and walking time or distance to the destination location should a vacant parking space be found when traversing the parking route; and a second term including a penalty associated with travelling to the end of the parking route and not finding a parking space weighted (e.g. multiplied) by the probability of not finding a parking space on the parking route.

In embodiments, the determined cost for a given parking route (also) includes a penalty associated with travelling from the end of the parking route to the destination location in the event that a parking space is not found weighted (e.g. multiplied) by the probability of not finding a parking space on the parking route.

In embodiments, the determined cost for a given parking route (further) includes a constant penalty weighted (e.g. multiplied) by the probability of not finding a parking space on the parking route, optionally wherein the value of the constant penalty can be set or selected based on the user's preferences.

It will be appreciated that the costs/penalties of the cost function may generally be formulated either in terms of time or distance. Thus, any reference to a travel or walking time, or time penalty, used herein may equally apply to a travel or walking distance, or distance penalty, and vice versa. Using distances may in some cases be more precise. However, it may be more intuitive for a user to be presented with costs in terms of the associated time, and preferably the costs are formulated in terms of times. The travel or walking time may generally be determined from the corresponding distance, e.g. by assuming a constant travel or walking speed, or potentially also taking into account expected speed profiles, and so on, as described elsewhere herein.

It will also be appreciated that the cost function may include additional terms, if desired. For example, in embodiments, the determined cost for a given parking route may include a penalty relating to the number of segments included along the parking route. That is, an additional (time or distance) penalty proportional to the number of segments along the parking route may be added. In other words, an additional penalty per segment may be added to the cost function to favour relatively shorter parking routes, e.g. which may be easier to visualise. As another example, additional penalties may be included to discourage parking routes including U-turns or otherwise undesirable route characteristics. For instance, a penalty may be introduced for each U-turn along the parking route. Furthermore, the first and second (or further) terms may be weighted appropriately in the sum and/or various conversion factors may be used in order to scale the cost values.

The method further comprises selecting one or more parking route(s) for output based on the determined costs. For example, the candidate parking routes may be ranked or otherwise compared on the basis of the determined costs. The candidate parking route(s) having the optimum cost may then be selected for output (and output) to the user as the parking route. The parking route(s) that are generated in accordance with the present invention in any of its aspects or embodiments may be output and/or used in any desired and suitable way. The method thus extends to outputting and/or using determined parking route(s) obtained in accordance with the invention in any of its aspects. For example, in embodiments the method further comprises providing information indicative of a determined parking route to a user. This may involve outputting the route or information indicative thereof to a user. The information may be in any way indicative of the route, e.g. a set of instructions, which may be audible, visual and/or haptic, but preferably is a visual representation of the route.

In embodiments, the method thus comprises displaying the parking route to a user, e.g. on a display of a navigation device of the user. The step of displaying the route may comprise superposing the route on the electronic map. The parking route may be displayed on the navigable network to provide a navigation guidance view in any suitable and desired manner. For instance, as is generally known, the navigation guidance may be provided either in a 2D or 3D view. However, other forms of output may be used. For example the method may alternatively or additionally comprise printing information indicative of the at least one route. Thus, the information indicative of the route is preferably output to a user via a navigation device, but in other embodiments the information may be output by any suitable processing device, e.g. by being displayed by a computer apparatus having route generating capability but not necessarily navigation capability, etc. This may be relevant where the route is generated by a server.

In embodiments, the sub-network may also be visualised along with the parking route during parking search guidance (both in 2D and 3D guidance views). Thus, in embodiments, the method may comprise providing data indicative of the sub-network for output along with the selected parking route(s), e.g. so that the sub-network can be displayed along with the parking route(s). The segments of the sub-network may be coloured or otherwise visualised based on their current parking probability and/or based on the current average search time. For example, thresholds may be set and segments may be visualised differently, e.g. so that segments with a relatively short average search time (or high parking probability) are visualised in a first manner (e.g. coloured "green") whereas segments with a relatively longer average search time (or low parking probability) are visualised in a second manner (e.g. coloured "yellow" or "red"). Another way to think about this is in terms of expected distance between parking spaces, e.g. where the expected distance between parking spaces is less than a first distance, the segments may be coloured "green"; less than a second distance coloured "yellow"; and the rest "red".

The method of the present invention may accordingly be implemented in the context of a navigation operation. Thus, as mentioned above, the method may be carried out, at least in part, by a system or device having navigation functionality. However, it will be appreciated that the methods may also be carried out by any suitable system or device having route generating capability, but not necessarily navigation functionality. For example, the methods may be implemented by a computer system, e.g. a desktop or laptop system, which does not have navigation functionality. A user may be presented with a generated route which may then be printed or otherwise used to aid route selection at a subsequent time, or, for example, the route may be stored for future use, e.g. downloading to a navigation device.

In some embodiments, the step of generating a parking route is performed on a server. In other embodiments, the parking probability data for segments are sent to a navigation device (from a server) and the parking routes are generated by the navigation device. Thus, as discussed above, the method may be carried out, at least in part, using a navigation device. The navigation device may be a PND or an integrated, e.g. in-vehicle, device. The navigation device may comprise a display for displaying an electronic map to a user, a set of one or more processors configured to access digital map data and cause an electronic map to be displayed to a user via the display, and a user interface operable by a user to enable the user to interact with the device.

Any of the methods in accordance with the present invention may be implemented at least partially using software, e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include navigation satellite, e.g. GPS (Global Positioning System) or GLONASS, signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

It should be noted that references to a parking probability or parking probability value, or a parking route, herein should be understood to refer to data indicative of these factors unless the context demands otherwise. The data may be in any way indicative of the relevant feature, and may be directly or indirectly indicative thereof. Thus any reference to a parking probability may be replaced by a reference to data indicative thereof, i.e. parking probability data. It should also be noted that the phrase "associated therewith" in relation to one or more segments should not be interpreted to require any particular restriction on data storage locations. The phrase only requires that the features are identifiably related to a segment, e.g. such that these values may be used in accordance with the methods described herein.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Preferred embodiments of the present invention will now be described with particular reference to a PND. It should be remembered, however, that the teachings of the present invention are not limited to PNDs but are instead universally applicable to any type of processing device that Is configured to execute navigation software so as to provide route planning and navigation functionality. It follows therefore that in the context of the present application, a navigation device is intended to include (without limitation) any type of rout planning and navigation device, irrespective of whether that device is embodied as a PND, a navigation device built into a vehicle, or indeed a computing resource (such as a desktop or portable personal computer (PC), mobile telephone or portable digital assistant (PDA) executing route planning and navigation software.

Embodiments of the present invention relate to the generation of parking routes for use in assisting a driver when searching for a parking space. For instance, when a driver is moving towards a destination, especially within a congested urban area, the driver may start looking for available on-street parking spaces. This can be a time-consuming process and often results in the driver performing loops around the destination. Thus, when a driver is searching for a parking space, according to embodiments of the present invention, a parking route is generated as having a high probability of including a vacant parking space, and the driver may thus be directed along the parking route to try and reduce the amount of time spent searching for a parking space.

Figure 1:
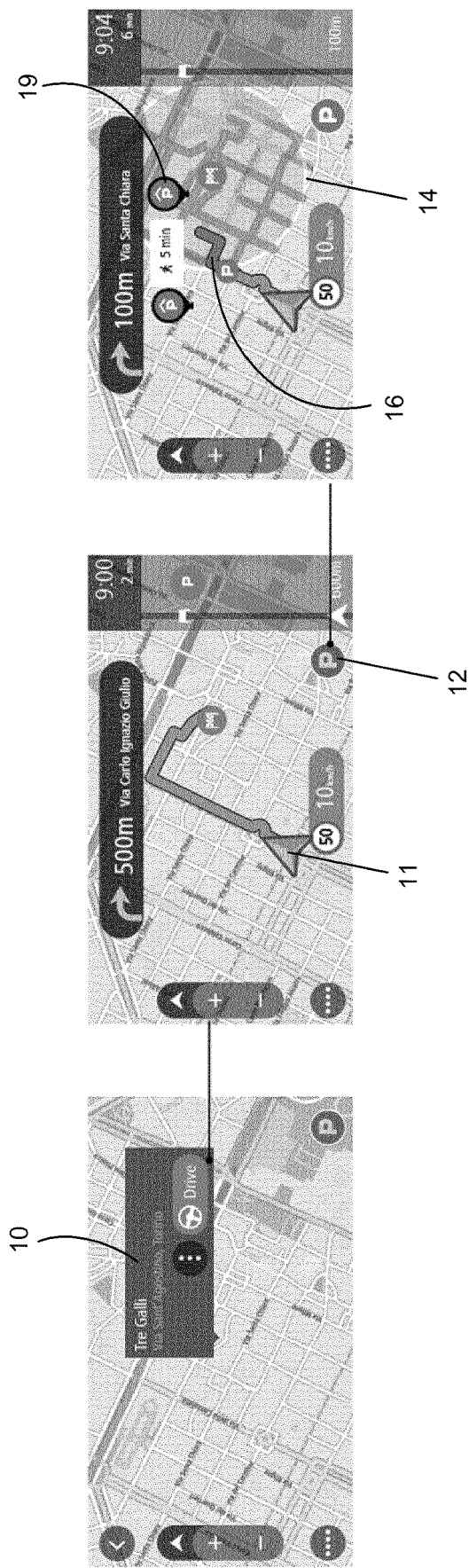
FIG. 1 illustrates how parking route information may be displayed in embodiments to a user travelling along a predetermined route towards a destination.

FIG. 1 illustrates how such parking route information may be displayed, e.g. on a PND, in embodiments to a user travelling along a predetermined route towards a known destination. As illustrated in the left hand panel of FIG. 1, the user initially selects a destination 10 (here, "Tre Galli, Via Sant' Agostino, Torino"), and the PND then calculates a route to the destination 10 and starts providing navigation guidance, e.g. as shown in the middle panel. As is typically done, the route to the destination is displayed on top of the electronic map, along with navigation instructions and other route characteristics such an estimated arrival time and speed information, and an icon 11 representing the current position of the vehicle. At least when the user is within a certain distance from the destination (and preferably at all times), a parking icon 12 is displayed on the PND. The user may then tap (or otherwise interact) with the parking icon 12 to generate a parking route and cause the PND to enter parking route guidance mode. Thus, as shown in right hand panel of FIG. 1, in response to the user tapping the parking icon 12, a sub-network 14 of road segments within a certain reachability of the destination in terms of walking time or distance is generated and a parking route 16 through the sub-network is determined and displayed to the user. As shown in FIG. 1, the road segments within the sub-network 14 in the vicinity of the destination may be appropriately coloured or otherwise displayed in order to provide a visual indication of the parking probability and/or expected parking time associated with those segments. The display also shows a number of off-street parking spaces (e.g. car parks) 19 within the region which the driver might alternatively wish to explore, e.g. in the event that no on-street parking is available. The user may tap the parking icon 12 again at any time to exit the parking route guidance and return to normal navigation guidance.

Figure 2:
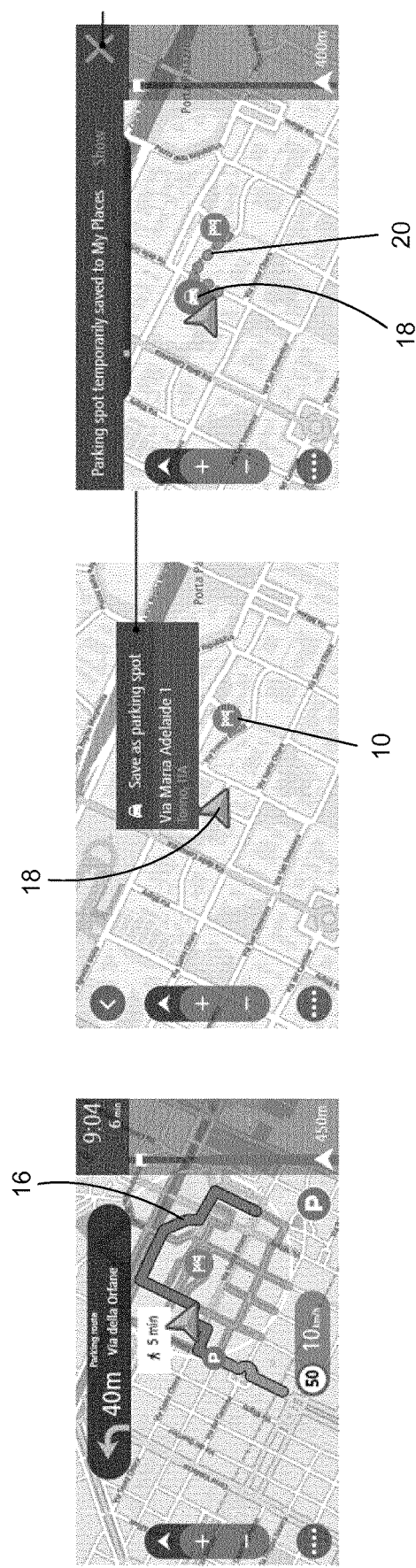
FIG. 2 illustrates an example of a display when the user is being guided along a parking route.

FIG. 2 illustrates an example of the display when the user is being guided along the parking route 16. Once it is detected that the driver has successfully parked, the parking guidance is stopped and the location of the parking space 18 is temporarily saved as shown in the middle panel of FIG. 2. The walking route 20 to the destination 10 may then be displayed as shown in the right hand panel of FIG. 2.

Figure 3:
FIG. 3 shows how a display may prompt a user to enter parking search mode.

In FIG. 1, as described above, the parking search guidance is activated by a user selection when the vehicle is approaching a known destination at the end of a predetermined route. In embodiments, the display may prompt the user to enter parking search mode when approaching a known destination. For example, in the case shown in FIG. 3, it is determined (or known) e.g. using the parking probabilities and/or live probe data within the vicinity of the destination, that there is or is expected to be limited on-street parking available. Thus, when approaching the destination, the display informs the user that street parking is limited at the destination and prompts the user to add parking. Once the user selects to add parking, a parking route may thus be generated and parking guidance provided, e.g. as shown in FIG. 2. However, it is also contemplated that parking search guidance may be provided automatically when a driver is approaching a known destination. In other cases the parking route may be calculated at the start of the journey.

Figure 4:
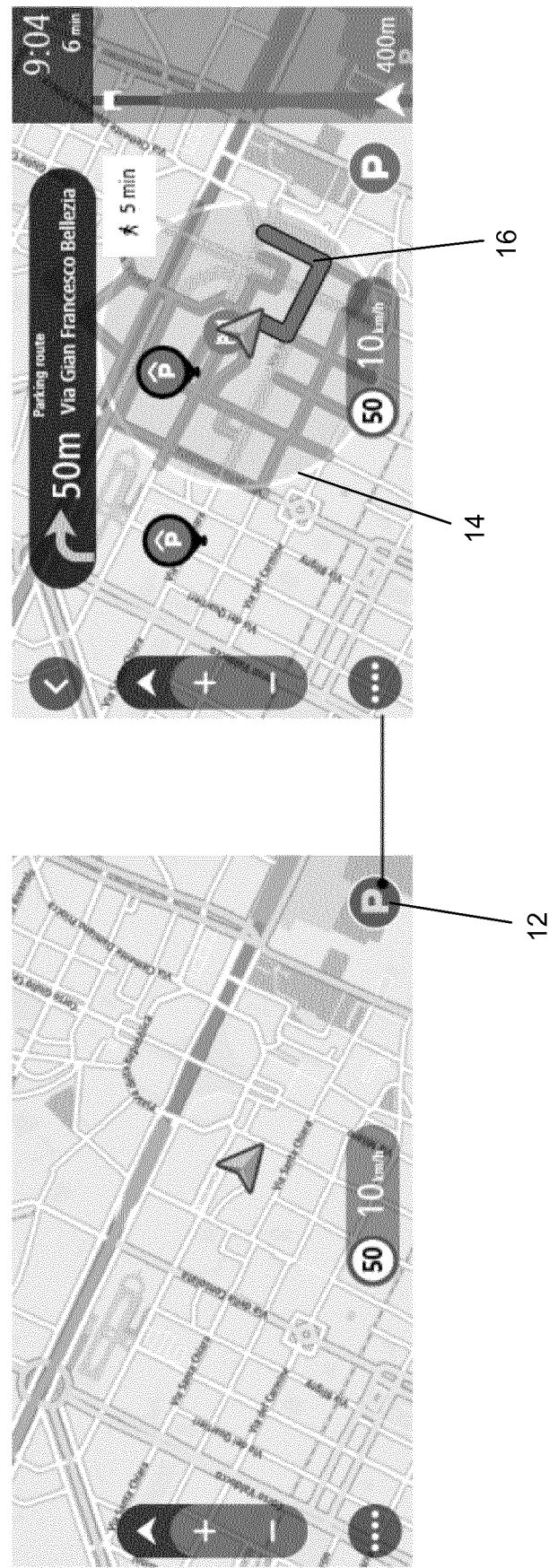
FIG. 4 illustrates how parking route information may be displayed in embodiments based on a user activating parking guidance.

It will be appreciated that parking guidance may also be provided during free-driving mode, e.g. where there is no known destination. For example, even when the user is not following a predetermined route towards a destination, it may still be desired to provide parking guidance so that the driver can rapidly find a parking space within their current vicinity. FIG. 4 shows an example of this case where parking route information within the vicinity of the current position of the vehicle is displayed based on a user activating parking guidance. Thus, the parking icon 12 may be permanently displayed on the display and activated at any time in order to enter parking guidance mode (as shown in the right hand panel of FIG. 4).

Figure 6:
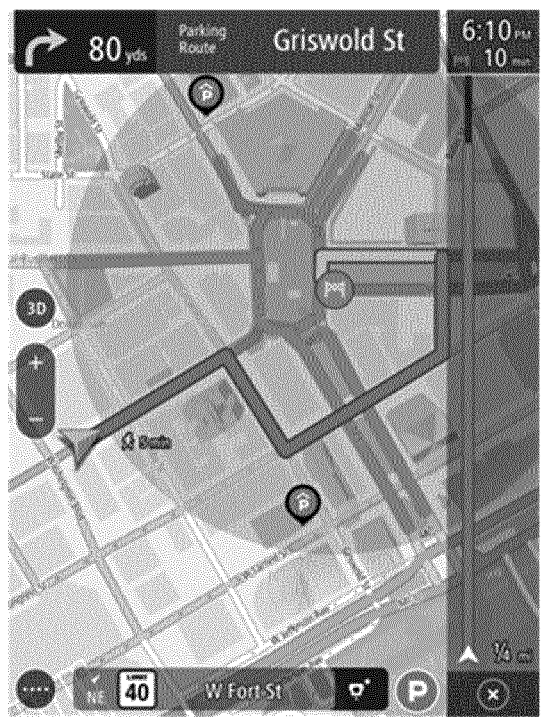
FIG. 6 illustrates how parking route guidance information may be displayed using a 2D navigation view.
Figure 7:
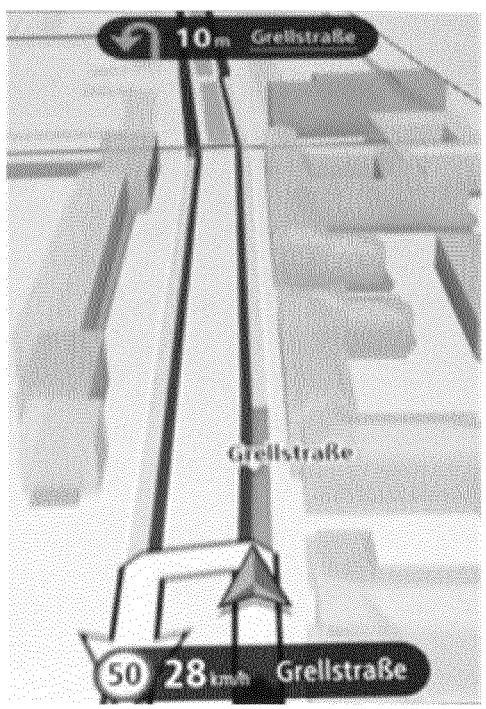
FIG. 7 illustrates how parking route guidance information may be displayed using a 3D navigation view.

Other examples of parking guidance are shown in FIGS. 6 and 7.

Figure 5:
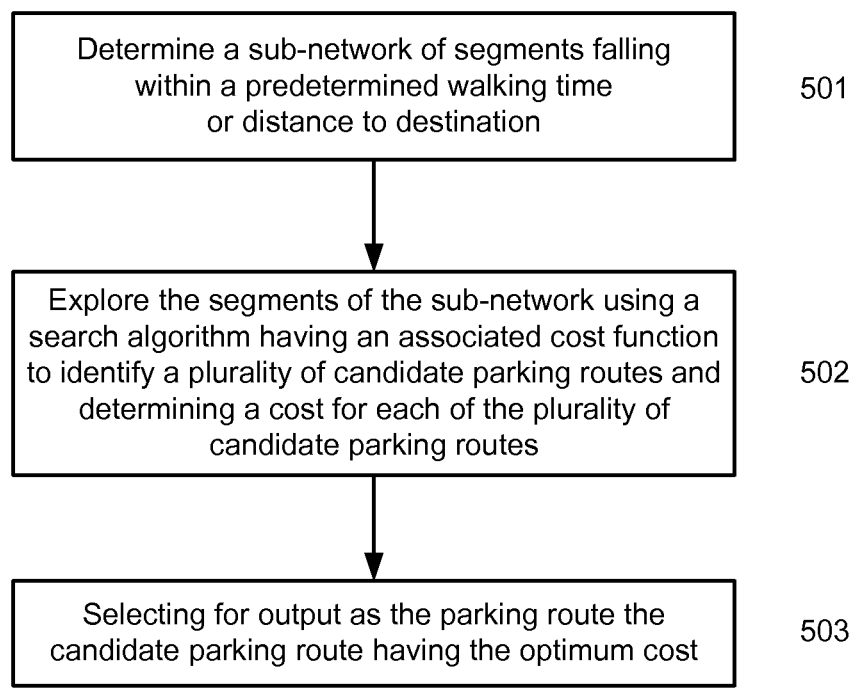
FIG. 5 is a flowchart illustrating a method according to an embodiment of the present invention.

A method according to an embodiment of the present invention is generally illustrated in FIG. 5. As shown, the method starts by determining sub-network of road segments of an electronic map that are within a predetermined walking time or distance of the a destination location (step 501). This destination location can be: the destination of a predetermined route (selected by the driver or predicted by the system); a current location of a vehicle (e.g. when there is no route or wherein the driver wishes to park as soon as possible); or a new location selected by the driver. The sub-network determination preferably involves a (e.g. backwards) search from the destination location effectively to define a reachability area (e.g. as described in WO 2014/001565 A1, although a more simplistic method could be used based on a straight line distance between each road segment and the destination location. User research has determined that the walking distance should be 400 m, although it can easily be selected or changed by the user as desired. While the sub-network will only include road segments, i.e. segments that can be traversed by a vehicle (and potentially also by a person), the search preferably used to determine the sub-network can also take into account pedestrian segments, i.e. segments that can only be traversed by a person, to give a more accurate walking time or distance for a segment.

The end result of step 501 is a sub-network of the electronic map that represent roads within a certain walking time or distance of the destination, wherein at least some of the roads have at least one parking space, and wherein each of the segments (or at least those on which parking is possible) has associated with it a walking time to the destination (e.g. assuming a constant walking speed, e.g. of 5 km/h). Each segment of the sub-network also has a length, which enables a driving time for that segment to be determined. For instance, the driving time when searching for parking is determined assuming a constant driving speed, e.g. of 12 km/h. For segments on which parking is not possible, the driving time is preferably determined in a normal manner using a time-dependent speed profile (e.g. as described in WO 2009/053411 A1 and WO 2017/129586 A1). In other words, each segment of the sub-network also has associated with it data indicative of a driving time.

A plurality of parking routes are then determined from an origin location on the sub-network by exploring the network using a cost function to generate a parking route that effectively tries to optimise parking probability and search time. Thus, the segments of the sub-network can be explored using a search algorithm to identify a plurality of candidate parking routes and a cost for each of the plurality of candidate parking routes can be determined using an associated cost function of the search algorithm (step 502). The origin location could be a current location of a vehicle, e.g. if the user is not following a predetermined route (and decides to manually trigger the calculation of a parking route). Alternatively, if a route has been predetermined to a known destination, then the origin location could be the first segment of the sub network on the predetermined route, or e.g. the first segment of the sub-network after the user has manually triggered, or confirmed an automatic suggestion to trigger, the calculation of a parking route.

The candidate parking route with the optimal cost can thus be selected for output as the parking route, e.g. for display to a user (step 503). The output is a parking route where the walking time or distance to the destination is less than the desired threshold (e.g. 400 m) and that has a certain amount of expected cumulative driving and walking time (e.g. 20 minutes).

Various suitable algorithms may be used for generating a parking route according to embodiments of the present invention. An example of a preferred parking route algorithm will now be described.

The input for the parking route algorithm may suitably comprise, among other variables, any or all of:
a directed graph representing the road network;
destination location, as a vertex in the graph;
current location, as a vertex in the graph (close to destination);
for each segment a, the probability p(a) that there is a vacant parking space;
for each segment a, time t(a) to drive through it;
for each segment a, time w(a) to walk from the middle of this arc to the destination, if we park there; and
for each segment a, the segment o(a) which is the segment that describes the opposite direction of the same road (it is assumed that driving though a street in one direction sets the probability for both directions to zero. That is, it is assumed that the driver scans both sides of the road and that free parking spaces will never reappear).

It will be appreciated that a parking route is generally defined by a connected set of segments $(a_1, \ldots, a_n)$ within the sub-network. For a given parking route $(r=a_1, \ldots, a_n)$ it is thus possible to calculate from the input(s) above various relevant properties including, but not limited to:

The modified parking probability $p_i$ for segment a which takes into account that the user may have seen that segment before:

$$p_i = \begin{cases} p(a_i) & \text{if } \{a_i, o(a_i)\} \cap \{a_1, \ldots, a_{i-1}\} = \emptyset \\ 0 & \text{otherwise} \end{cases}$$

The success probability $p^s$ of finding parking when following this route:

$$p^s = 1 - \left(\prod_{i=1}^{n}(1 - p_i)\right)$$

The probability $s_i$, of parking on a particular segment a when following this route (which is the combination of not finding parking earlier already and then finding parking on $a_i$):

$$s_i = \left(\prod_{j=1}^{i-1}(1 - p_j)\right) \cdot p_i$$

The time for driving through segments $a_1$ to $a_i$:

$$t_i = \sum_{j=1}^{i} t(a_j)$$

The expected cumulative time for driving and walking, assuming that parking is not found (note that when parking is found on segment $a_i$, the expected time is determined for the middle of the arc rather than just summing to i (as in Arndt et al.), hence the additional term $t(a_i)/2$. This is believed to give more realistic results):

$$t^s = \left(\sum_{i=1}^{n} s_i \cdot \left(t_{i-1} + \frac{t(a_i)}{2} + w(a_i)\right)\right) / p^s$$

It will be appreciated that this term is not simply a sum of a weight per arc. However, this can still be calculated incrementally. That is, given $p^s$ and $t^s$ for some route $r=a_1, \ldots, a_n$ it is possible to calculate $t^s_{n+1}$ that results from appending another segment $a_{n+1}$ to the route, yielding a speedup over calculating $t^s_{n+1}$ from scratch. For this, the probability of parking on $a_{n+1}$ is first calculated, assuming that parking is found:

$$x_{n+1} = ((1-p^s) \cdot p_{n+1}) / (1 - ((1-p^s) \cdot (1-p_{n+1})))$$

and then:

$$t^s_{n+1} = (1 - x_{n+1})t^s + x_{n+1} \cdot \left(t_n + \frac{t(a_{n+1})}{2} + w(a_{n+1})\right)$$

It will be appreciated that the algorithms according to embodiments of the present invention may have some similarities with those described in Arndt et al. However, the method used in embodiments of the present invention may differ both in terms of model (optimisation goal) and in the search algorithm used to explore the sub-network.

For instance, in Arndt et al., the cost function is given by:

$$c_r = \begin{cases} p^s t^s + (1-p^s)t_n & \text{if } p^s > 1 - \varepsilon \\ \infty & \text{otherwise} \end{cases}$$

This corresponds to the assumption that when reaching the end of the parking route, we'll find parking immediately and have zero walking time to the destination. The assumption is that if $\varepsilon$ is small (e.g. 1%), this case is negligible and the assumption does not matter much.

The Applicant has recognised that there may be various problems with this approach, both algorithmically and also from the domain modelling perspective. For instance, using the cost function described in Arndt et al., a path with same time expectation but e.g. 20% vs. 40% parking probability would have the same cost (i.e. infinity). This makes it hard to guide the optimization process towards more promising paths. Furthermore, there is no universally 'good' value for $\varepsilon$. For instance, given the constraints on walking and total time, in some situations we might not get a route at all. This means that $\varepsilon$ should not be set too low. However, in that case, e.g. with $\varepsilon=0.2$, a path with the same time expectation but e.g. 80% vs. 99% parking probability would have the same cost, while for a driver the second one is clearly better.

Thus, in embodiments of the present invention, the following cost function may advantageously be used, for all candidate parking routes:

$$c_r = p^s t^s + (1-p^s)(t_n + t^e t^b).$$

Here, $t^e$ is the time for driving from the end of the route to the destination location, and $t^b$ is a constant time penalty, e.g. of about 20 minutes. The time penalty can be explained by the driver's preferences. For instance, the driver must have an alternative plan for what to do when on-street parking cannot be found, e.g. to buy off-street parking, or give up and drive home, or park illegally. Thus, if the driver was asked whether for a certain on-street parking search duration they would agree to that or go for the alternative plan, there is expected to be some threshold where the driver would rather go for the alternative plan. This is represented by the cost $t^b$. When the driver reaches the end of the parking route (cost $t_n$) and gives up on on-street parking, they need to first drive to the destination (cost $t^e$) and then enact plan B (cost $t^b$); this happens with probability $1-p^s$.

It will be appreciated that this cost function may therefore offer a more realistic representation of the real-world situation than that described in Arndt et al.

Although the cost function has been described above in relation to time values, it will be appreciated that the cost function may equally be formulated in terms of distances. That is, instead of considering a travel or walking time, or a time penalty, when determining the cost for a candidate parking route, the cost function may instead be formulated in terms of travel or walking distances, and distance penalties. Thus, any reference to a time value above may be replaced, in embodiments, with a corresponding distance value.

The search algorithm used in Arndt et al. to explore the segments to generate candidate parking routes is a standard branch-and-bound algorithm. In embodiments, an algorithm is used that follows the same basic breadth-first-search strategy described in Arndt et al., where a set of paths (i.e. candidate parking routes) is held and all possibilities of extending them by one arc are generated, until a maximum length is reached, and the best ever recorded path is returned. However, several enhancements are contemplated that make this exponential-time approach feasible by trading off solution quality for running time. Together, this allows substantially better results, faster than the Arndt et al. algorithm.

For instance, in embodiments, the overall running time of the search algorithm may be bounded by setting a maximum on the number of segments in a path (e.g. say 50 segments) and/or by keeping the number of paths per path length below a threshold (e.g. keeping a maximum of 250 paths per path length), namely those with the best costs. Together, these approaches may give an upper bound on the running time (the constants are chosen such that this running time is reasonable on the relevant devices). In principle, running time is already bounded because there are only finitely many paths within the search time and walking distance limit, but this may still be a relatively large search space.

Furthermore, paths may suitably be pruned. For example, for some paths, it can be proven that they cannot be extended to an optimal path, or that it would yield only negligible improvements. The best possible extension of a path is to drive to the destination and to immediately find parking there. This gives a lower bound LB on the cost of any extension of a path. If LB is worse than the currently best known cost, the path can be pruned. Also, if the path visits the same vertex twice without picking up nonzero parking probability in between, the cycle could be eliminated and the path can be pruned. (In this case, it needs to be ensured that the shortcut route doesn't violate turn restrictions.) For example, if 1−(LBI (expected time for driving plus expected time for walking))<0.01, we can improve a solution by at most 1% by extending the path, and so the path can be pruned.

Often a good solution may be found relatively quickly, and then time may be wasted looking for other solutions without any substantial improvements. In embodiments, this can be detected and the parking search algorithm terminated early. For example, if a path with a relatively high probability, above a suitable threshold (e.g. 99%), is found, and afterwards there is no improvement for a certain number of cycles (e.g. 10), the parking search algorithm can be terminated early. In any case, if there is no improvement for e.g. 25 rounds, the algorithm may be terminated.

In another embodiment, the parking search algorithm continues to explore the segments of the sub-network, when a candidate parking route is identified for which the probability of the vehicle successfully finding a parking space on the parking route exceeds a predetermined parking success probability threshold and one or more candidate parking routes for output are selected based on the determined cost.

Various other adjustments to the model (cost function) and algorithm are also contemplated. For instance, in embodiments, a cost penalty may be added per segment to discourage needlessly long routes which are harder to visualise. For example, a penalty of 0.5 seconds may be added to the cost function per segment. Similarly, cost penalties may be added e.g. to discourage U-turns or other undesirable route characteristics. For instance, a penalty of 120 seconds may be added for a U-turn.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

It should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A method of determining a parking route for a vehicle travelling on a road network within a geographic area, wherein at least some roads of the road network have at least one parking space associated therewith, the road network being represented by an electronic map comprising a plurality of segments representing the roads of the road network, each segment having one or more attributes associated therewith including a length attribute indicative of a length of the segment, and wherein at least segments representing roads having at least one parking space have a probability attribute indicative of a probability of there being a vacant parking space on those segments, the method comprising:

obtaining a destination location within the geographic area;

generating a sub-network that includes a subset of segments of the electronic map by:

defining a reachability area proximal to the destination location, the defining including following each of one or more paths away from the destination location until a predetermined walking time or distance has been reached for that path and adding an area associated with that path to the reachability area, wherein following the one or more paths includes following road segments that can be traversed by vehicles and pedestrians and pedestrian segments that can only be traversed by pedestrians; and adding, to the sub-network, specified segments in an area associated with each of the one or more paths, wherein the specified segments include only road segments;

associating, at least for the segments of the sub-network representing roads having at least one associated parking space, data indicative of a walking time or distance from the segment to the destination location;

exploring, using a search algorithm having an associated cost function, the segments of the sub-network from an origin location to identify a plurality of candidate parking routes, wherein each candidate parking route comprises a path of connected segments of the sub-network, said exploring comprising determining a cost for each of the plurality of candidate parking routes according to the cost function using the length attribute and probability attribute of each segment of the parking route, wherein the cost for a given parking route is based on a probability of the vehicle successfully finding a vacant parking space among the parking spaces associated with segments of the parking route and an expected cumulative travel and walking time or distance to the destination location should a vacant parking space be found along the parking route, the cumulative travel and walking time or distance comprising a sum of the travel time or distance to the vacant parking space and the walking time or distance from the vacant parking space to the destination location;

selecting one or more of the candidate parking routes based on the determined costs; and displaying a visual representation of some or all of the one or more parking routes on a display, the visual representation including each of the some or all of the one or more parking routes superposed on respective segments of the electronic map.

2. The method of claim 1, wherein, when a candidate parking route is identified for which the probability of the vehicle successfully finding a vacant parking space on the candidate parking route exceeds a predetermined parking success probability threshold, the search algorithm is terminated early.

3. The method of claim 1, comprising terminating the search algorithm early when a candidate parking route is identified for which the probability of the vehicle successfully finding a vacant parking space on the candidate parking route exceeds a predetermined parking success probability threshold and afterwards there is no improvement for a certain number of cycles.

4. The method of claim 1, wherein one or more candidate parking routes for output are selected based on the determined cost, when a candidate parking route is identified for which the probability of the vehicle successfully finding a vacant parking space on the candidate parking route exceeds a predetermined parking success probability threshold, while the segments of the sub-network are still being explored.

5. The method of claim 1, wherein the cost for the given parking route includes a sum of:

a first term representing the probability of the vehicle successfully finding a vacant parking space when traversing the parking route weighted by an expected cumulative travel time or distance along the parking route and walking time or distance to the destination location should the vacant parking space be found when traversing the parking route; and a second term including a penalty associated with travelling to an end of the parking route and not finding the vacant parking space weighted by a probability of not finding a vacant parking space on the parking route.

6. The method of claim 1, wherein the cost for the given parking route includes a penalty associated with travelling from an end of the parking route to the destination location when the vacant parking space is not found weighted by a probability of not finding a vacant parking space on the parking route.

7. The method of any claim 1, wherein the cost for the given parking route includes a constant penalty weighted by a probability of not finding a vacant parking space on the parking route, optionally wherein a value of the constant penalty can be set or selected based on a user's preferences.

8. The method of claim 1, wherein the cost for the given parking route includes a penalty relating to a number of segments included along the parking route.

9. The method of claim 1, wherein the search algorithm comprises a branch-and-bound algorithm.

10. The method of claim 1, comprising setting a maximum number of segments for inclusion within the candidate parking routes being identified using the search algorithm.

11. The method of claim 1, comprising setting a maximum number of candidate parking routes that are held by the search algorithm during the step of exploring the segments of the sub-network.

12. The method of claim 1, wherein the destination location is a destination location along a predetermined route within a navigable network along which the vehicle is being guided.

13. The method of claim 1, wherein the destination location is a current location of the vehicle.

14. The method of claim 1, wherein displaying the visual representation includes displaying the sub-network.

15. A system configured to determine a parking route for a vehicle travelling on a road network within a geographic area, wherein at least some roads of the road network have at least one parking space associated therewith, the road network being represented by an electronic map comprising a plurality of segments representing the roads of the road network, each segment having one or more attributes associated therewith including a length attribute indicative of a length of the segment, and wherein at least segments representing roads having at least one parking space have a probability attribute indicative of a probability of there being a vacant parking space on those segments, the system including processing circuitry configured to:

obtain a destination location within the geographic area;

generate a sub-network that includes a subset of segments of the electronic map by:

defining a reachability area proximal to the destination location, the defining including following each of one or more paths away from the destination location until a predetermined walking time or distance has been reached for that path and adding an area associated with that path to the reachability area, wherein following the one or more paths includes following road segments that can be traversed by vehicles and pedestrians and pedestrian segments that can only be traversed by pedestrians; and adding, to the sub-network, specified segments in an area associated with each of the one or more paths, wherein the specified segments include only road segments;

associate, at least for the segments of the sub-network representing roads having at least one associated parking space, data indicative of a walking time or distance from the segment to the destination location;

explore, using a search algorithm having an associated cost function, the segments of the sub-network from an origin location to identify a plurality of candidate parking routes, wherein each candidate parking route comprises a path of connected segments of the sub-network, wherein the processing circuitry being configured to explore the segments of the subnet-work includes the processing circuitry being configured to determine a cost for each of the plurality of candidate parking routes according to the cost function using the length attribute and probability attribute of each segment of the parking route, wherein the cost for a given parking route is based on a probability of the vehicle successfully finding a vacant parking space among the parking spaces associated with the segments of the parking route and an expected cumulative travel and walking time or distance to the destination location should a vacant parking space be found along the parking route, the cumulative travel and walking time or distance comprising a sum of the travel time or distance to the vacant parking space and the walking time or distance from the vacant parking space to the destination location;

select one or more of the candidate parking routes for output based on the determined costs; and display a visual representation of some or all of the one or more parking routes on a display, the visual representation including each of the some or all of the one or more parking routes superposed on respective segments of the electronic map.

16. The system of claim 15, wherein, when a candidate parking route is identified for which the probability of the vehicle successfully finding a vacant parking space on the candidate parking route exceeds a predetermined parking success probability threshold, the search algorithm is terminated early.

17. The system of claim 15, wherein the search algorithm is terminated early when a candidate parking route is identified for which the probability of the vehicle successfully finding a vacant parking space on the candidate parking route exceeds a predetermined parking success probability threshold and afterwards there is no improvement for a certain number of cycles.

18. The system of claim 15, wherein the processing circuitry being configured to select one or more of the candidate parking routes for output includes the processing circuitry being configured to do so when a candidate parking route is identified for which the probability of the vehicle successfully finding a vacant parking space on the candidate parking route exceeds a predetermined parking success probability threshold, and while the segments of the sub-network are still being explored.

19. A non-transitory computer program product comprising instructions which, when executed by one or more processors of a navigation device, cause the navigation device to perform a method of determining a parking route for a vehicle travelling on a road network within a geographic area, wherein at least some roads of the road network have at least one parking space associated therewith, the road network being represented by an electronic map comprising a plurality of segments representing the roads of the road network, each segment having one or more attributes associated therewith including a length attribute indicative of a length of the segment, and wherein at least segments representing roads having at least one parking space have a probability attribute indicative of a probability of there being a vacant parking space on those segments, the method comprising:

obtaining a destination location within the geographic area;

generating a sub-network that includes a subset of segments of the electronic map by:

defining a reachability area proximal to the destination location, the defining including following each of one or more paths away from the destination location until a predetermined walking time or distance has been reached for that path and adding an area associated with that path to the reachability area, wherein following the one or more paths includes following road segments that can be traversed by vehicles and pedestrians and pedestrian segments that can only be traversed by pedestrians; and adding, to the sub-network, specified segments in an area associated with each of the one or more paths, wherein the specified segments include only road segments;

associating, at least for the segments of the sub-network representing roads having at least one associated parking space, data indicative of a walking time or distance from the segment to the destination location;

exploring, using a search algorithm having an associated cost function, the segments of the sub-network from an origin location to identify a plurality of candidate parking routes, wherein each candidate parking route comprises a path of connected segments of the sub-network, said exploring comprising determining a cost for each of the plurality of candidate parking routes according to the cost function using the length attribute and probability attribute of each segment of the parking route, wherein the cost for a given parking route is based on a probability of the vehicle successfully finding a vacant parking space among the parking spaces associated with segments of the parking route and an expected cumulative travel and walking time or distance to the destination location should a vacant parking space be found along the parking route, the cumulative travel and walking time or distance comprising a sum of the travel time or distance to the vacant parking space and the walking time or distance from the vacant parking space to the destination location;

selecting one or more of the candidate parking routes for output based on the determined costs; and displaying a visual representation of some or all of the one or more parking routes on a display, the visual representation including each of the some or all of the one or more parking routes superposed on respective segments of the electronic map.

20. The method of claim 12, wherein the method of generating the parking route is triggered or prompted when the vehicle is within a predetermined threshold distance of the destination location.

\* \* \* \* \*